United States Patent [19]

Forsberg

[11] 3,739,347

[45] June 12, 1973

[54] CURSOR FOR USE IN PERFORMING GRAPHIC INPUT IN A DISPLAY

[75] Inventor: Charles A. Forsberg, Portland, Oreg.

[73] Assignee: Tektronix, Inc., Beaverton, Oreg.

[22] Filed: Mar. 20, 1970

[21] Appl. No.: 21,400

[52] U.S. Cl. .......... 340/172.5, 340/324 A

[51] Int. Cl. ..... G05b 1/06, G05b 19/30, G06f 3/14

[58] Field of Search .......... 340/172.5, 324 A; 315/18; 250/231 SE

[56] References Cited

UNITED STATES PATENTS

| | | | |
|---|---|---|---|
| 3,462,639 | 8/1969 | French | 315/19 |
| 3,505,665 | 4/1970 | Lasoff et al. | 340/324 A |
| 3,541,521 | 11/1970 | Koster | 340/172.5 |
| 3,562,718 | 2/1971 | Manber | 340/172.5 |
| 3,582,936 | 6/1971 | Kite | 340/324 A |
| 3,304,434 | 2/1967 | Koster | 250/231 |
| 3,337,860 | 8/1967 | O'Hara, Jr. | 340/324 A |
| 3,346,853 | 10/1967 | Koster et al. | 340/172.5 |
| 3,381,277 | 4/1968 | Stansby | 340/172.5 |
| 3,394,366 | 7/1968 | Dye | 340/324 A |
| 3,505,561 | 4/1970 | Ward et al. | 315/18 |
| 3,505,666 | 4/1970 | Thorpe | 340/324 A |
| 3,506,875 | 4/1970 | Watanabe et al. | 315/12 |
| 3,512,037 | 5/1970 | Eckert et al. | 315/10 |
| 3,551,896 | 12/1970 | Baskin et al. | 340/172.5 |
| 3,562,718 | 2/1971 | Manber | 340/172.5 |

OTHER PUBLICATIONS

"CRT Display with Pen Tracking," IBM Technical Disclosure Bulletin G. C. Randa, IBM Corporation, Vol. 5/No. 2, pp. 40–42, July 1962.

*Primary Examiner*—Paul J. Henon
*Assistant Examiner*—Jan E. Rhoads
*Attorney*—Buckhorn, Blore, Klarquist and Sparkman

[57] ABSTRACT

A pair of counter-registers are employed at a computer terminal for the reception of $x$ and $y$ coordinate information from a remote computer, and digital to analog converter means transform the register contents into deflection voltages for a cathode ray storage tube. A cursor display employs the same counter-registers, applying a series of impulses to such registers until the corresponding digital to analog converter outputs equal analog cursor inputs. The registers operate alternately and produce a large, cross-shaped cursor intersecting at the point of interest. The counter-registers can be stopped subsequent to comparison, and will then store digital information representing the coordinate address of the cursor intersection for introduction into the computer.

15 Claims, 2 Drawing Figures

CHARLES A. FORSBERG
*INVENTOR*
BY
*BUCKHORN, BLORE, KLARQUIST & SPARKMAN*
*ATTORNEYS*

CURSOR FOR USE IN PERFORMING GRAPHIC INPUT IN A DISPLAY

BACKGROUND OF THE INVENTION

A desirable form of computer terminal allows interactive graphic operation between a time-shared computer and a remote display. Thus, some kind of movable indicia can select the x and y coordinates of particular information or some point on a curve which is to be identified for the computer. The address of the selected point is sent back to the computer via the same communication system used in providing the original display from the computer.

An advantageous form of display includes a cathode ray tube wherein the movable indicia or cursor is established by analog deflection voltages selectively applied to the cathode ray tube deflection apparatus. Thus, a circle, dot, or other indication can be generated and moved from place to place with a pair of potentiometers, a joy stick, a "mouse," or the like. An analog to digital converter means is employed for translating the coordinate analog voltages of the cursor into digital information for transmission to a remote computer.

Unfortunately, due to drift and inaccuracy of the usual equipment, identification of a particular point on a display is frequently inaccurate, unless great pains are taken to insure tracking of the cursor analog to digital converter with the equipment used to establish the display in the first place. Moreover, "backlash" problems occur wherein the digital address of the cursor depends upon direction of cursor movement. At best, the accuracy with which a cursor digital address can be ascertained is limited.

SUMMARY OF THE INVENTION

In accordance with the present invention, *x* and *y* coordinates of a desired cursor are selected in analog fashion by means of potentiometers, a joy stick, or the like, and a pair of counter-registers employed for entering computer information into a display are caused to count in a given direction until digital to analog converters driven thereby compare with the cursor analog inputs. These counter-registers are operated sequentially in the alternative. Thus, when the *x* counter-register produces, via its digital to analog converter, an analog voltage which equals a selected cursor *x* input, the *x* counter-register ceases to count and the *y* counter-register starts counting. The cursor produced is a large cross extending across the face of the display, with the intersection thereof defining the point of interest. This cursor is large enough to be seen easily despite the limitation on cursor brightness in storage tube displays, for example. The successive comparison operations may be interrupted at a selected time whereby the registers will contain *x* and *y* digital addresses of the cursor.

Since the same digital register, and digital to analog converter means, are employed for the cursor as are employed for entry of information received from the computer, the address of a cursor intersection in the registers will accurately correspond with the coordinate address of computer information located at the same point on the display. Thus, the computer enters information into the display via a given register. If the cursor is now positioned at the same location in the same display using the same register, the retransmission of the address thereof back to the computer will accurately represent to the computer the particular information identified with the cursor.

It is an object of the present invention to provide an improved cursor system for a computer display avoiding misregistration problems between the cursor and the information in the display.

It is a further object of the present invention to provide an improved cursor system for a computer display wherein the cursor is easily seen and moved from place to place in the display.

It is a further object of the present invention to provide an improved cursor system for a computer display useful in straight-edge operations.

It is a further object of the present invention to provide an improved cursor system for a computer display operative to reduce the error in the cursor's digital address to a minimum.

It is another object of the present invention to provide an improved cursor system for a computer display having the advantages of optimum visibility of said cursor relative to the display, e.g. in the case of a storage tube display.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a block diagram of a cursor system according to the present invention; and FIG. 2 is an illustration of the cathode ray tube display of a cursor according to the present invention.

DETAILED DESCRIPTION

Figures 1, 2:
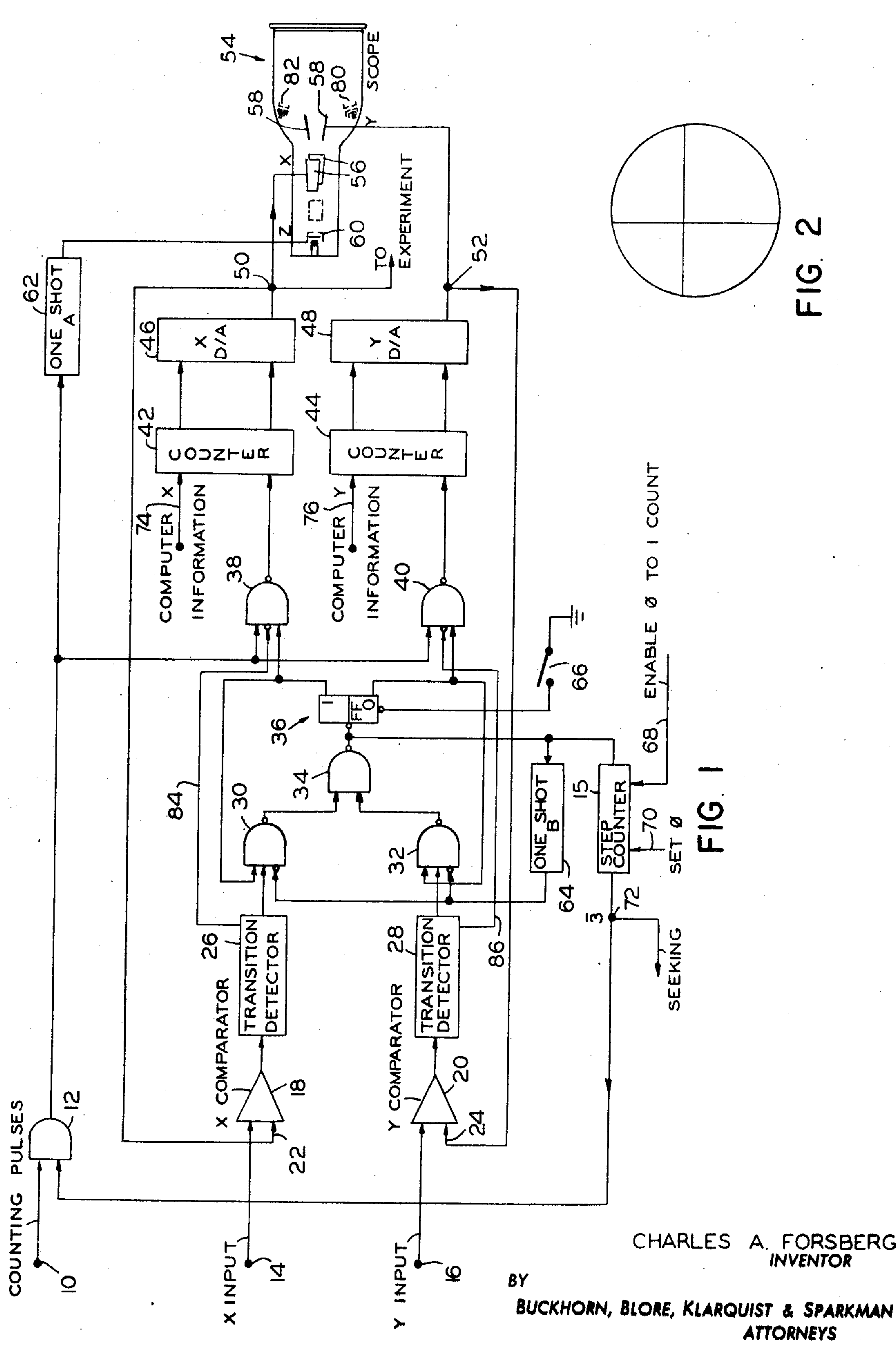

The apparatus illustrated in FIG. 1 represents part of a computer terminal which may be coupled to a remotely located, time-shared computer by way of a telephone line or like. Computer information is entered into the apparatus shown in FIG. 1 via channels indicated at 74 and 76. The digital information entered at 74 and 76 causes counter-registers 42 and 44 to assume the *x* and *y* coordinate addresses of bits of information to be displayed. The digital information residing in registers 42 and 44 is converted by means of *x* and *y* digital to analog converters 46 and 48, respectively, to *x* and *y* deflection voltages applied to cathode ray tube 54. Output 50 of digital to analog converter 46 is coupled to horizontal deflection plates 56 of cathode ray tube 54, while output 52 of digital to analog converter 48 is coupled to vertical deflection plates 58 of cathode ray tube 54.

Tube 54 is suitably a cathode ray storage tube having the facility of maintaining or remembering a given display on its target or face. Thus, the electron beam produced in cathode ray tube 54 causes secondary emission from the target area thereof, which secondary emission exceeds primary emission at selected locations. Flood guns 80 and 82 maintain the relatively positive condition of selected "written" locations. Cathode ray storage tubes of this type are well understood by those skilled in the art, and a detailed description will not be given.

According to the present invention, a cursor is also displayed on the face of the cathode ray tube, such cursor having the form of a large cross as illustrated in FIG. 2. This cross is provided in a "write-through" mode of the storage tube, whereby the cursor itself is not stored but may be moved from place to place to select and identify previously stored information. Movement of the cursor is accomplished through adjustment of $x$ and $y$ inputs supplied at terminals 14 and 16 in FIG. 1. The $x$ and $y$ inputs are analog voltages proportional to desired $x$ and $y$ deflection of the crossover point of the cursor and are provided by conventional means, not shown. E.G., each of the $x$ and $y$ inputs may be provided at the movable tap of a potentiometer, the ends of which are returned to DC voltage points representative of the deflection range. Such potentiometers may be operated by a common "joy stick" or "mouse" as well understood by those skilled in the art. The cursor is easily moved thereby such that its crossover point is located anywhere on the cathode ray tube display in accordance with the $x$ and $y$ analog inputs presented.

The $x$ input is provided as one input at $x$ comparator 18, while the y input is similarly applied as one input to $y$ comparator 20. The remaining input to $x$ comparator 18 is supplied on line 22 from output 50 of digital to analog converter 46. Similarly, an additional input 24 to $y$ comparator 20 is received from output terminal 52 of digital to analog converter 48. The $x$ and $y$ comparators operate transition detectors 26 and 28, respectively, which detect when the inputs on leads 22 and 24 exceed the $x$ and $y$ inputs respectively. The output of transition detector 26 is supplied as one input of nand-gate 30 while second and third inputs of this nand-gate are derived from flip-flop 36 and one-shot multivibrator 64. The latter is an inhibiting input. The output of transition detector 28 is applied to nand-gate 32 with the remaining two inputs of the last mentioned nand-gate again being supplied by flip-flop 36 and one-shot multivibrator 64. Again, the latter is an inhibiting input.

Flip-flop 36 provides an input to nand-gate 30 only when flip-flop 36 is in the one state, but provides an input to nand-gate 32 in its zero state. The outputs of nand-gates 30 and 32 form the inputs of nand-gate 34, which, in turn, operates flip-flop 36 and one-shot multivibrator 64. Step counter 15 may also be operated by nand-gate 34.

Step counter 15 supplies an output at terminal 72 connected as one of the inputs of and-gate 12, the latter having a remaining input comprising a series of counting pulses or clock pulses applied at terminal 10. Other inputs to step counter 15 comprise a set-zero input 70, and an enable-zero-to-one-count input on lead 68.

The one-state output of flip-flop 36 is also applied to nand-gate 38 together with an inhibiting input from transition detector 26 and the output of and-gate 12. The output of nand-gate 38 is connected as an additional input to counter-register 42. Similarly, nand-gate 40 receives the zero-state output of flip-flop 36 as well as an inhibiting input from transition detector 28 and an output from and-gate 12. Nand-gate 40 supplies an additional input to counter-register 44.

Another input to flip-flop 36 is provided from switch 66, the opposite terminal of which is grounded. When switch 66 is closed, flip-flop 36 is held in the zero state, thus just providing an input to nand-gate 32 and nand-gate 40.

And-gate 12 not only drives nand-gates 38 and 40, but also one-shot multivibrator 62 for providing pulses of predetermined length to grid 60 of cathode ray tube 54. The pulses thus supplied to grid 60 are sufficient for "write-through" of the cursor without storage of the cursor. Thus, each elemental portion of the cursor can be seen, but electron emission is not sufficient to cause storage thereof, which would, of course, render the cursor useless. The large size of the cursor, extending entirely across the cathode ray tube face as illustrated in FIG. 2, renders the cursor easily visible despite the limitation imposed upon brightness by desired non-storage of the cursor.

Considering operation of the cursor system according to the present invention, the step counter 15 may be set initially to a zero state by an impulse on lead 70. The step counter remains in this state despite inputs provided thereto from nand-gate 34, until an input is additionally supplied on lead 68. With the step counter in the zero state, the system is said to be in a seeking position, with a high zero state output being provided at terminal 72. This output enables and-gate 12 so that a series of counting pulses or clock pulses applied at terminal 10 are coupled to nand-gates 38 and 40, and one-shot multivibrator 62. One-shot multivibrator 62 turns on the cathode ray tube electron beam for short periods of time as hereinbefore indicated so the cursor will be visible at each clock pulse counted. The signal from gate 12 as applied to one or the other of nand-gates 38 and 40 will cause such gate to produce an output depending on the state of flip-flop 36.

Let us assume flip-flop 36 is in the zero state. Then, a series of pulses will be provided via nand-gate 40 to counter 44 causing the latter to count. When counter 44 reaches its maximum count, representative of maximum vertical deflection of the cathode ray tube, overflow and "fold over" occurs with the counter starting again at zero. Thus, absent any comparison by circuitry according to the present invention, the output of counter 44 would continually cause the "write-through" of a vertical line on the cathode ray tube face. However, when the y digital to analog converter 48 produces an output at terminal 52 which compares with the $y$ input at terminal 16, that is when the output at terminal 52 just exceeds the $y$ input at terminal 16, $y$ comparator 20 operates transition detector 28. At this time, transition detector 28 provides an inhibition for one count only on line 86 such that nand-gate 40 is disabled substantially when the output from $y$ digital to analog converter 48 equals the $y$ input at terminal 16. Thus, counter 44 stops counting. Also, gate 32 is operated by transition detector 28 and withdraws an input of nand-gate 34. The latter causes flip-flop 36 to change from the zero state to the one state whereby nand-gate 38 is operated instead of nand-gate 40.

As a result, the electron beam is deflected vertically from the bottom of the display to the intersection point of the cursor and vertical deflection thereupon temporarily ceases. Counting pulses from terminal 10 are now coupled by means of nand-gate 38 to counter 42 causing deflection of the electron beam to the right as a result of the deflection voltage provided in response to the counter accumulation by digital to analog converter 46. In the absence of a subsequent comparison, counter 42 would continue to count and "fold over," drawing a horizontal line on the oscilloscope face. However, after one fold over has taken place, and the output at terminal 50 compares with the $x$ input at terminal 14, $x$ comparator 18 operates transition detector 26. Transition detector 26 provides a one count inhibition signal on lead 84 which stops the $x$ counter. Also, flip-flop 36 changes back to the zero state in response to operation of gates 30 and 34. Operation of $y$ counter 44 will now be resumed whereby the electron beam proceeds vertically upwardly from the crossover point completing the cross-shaped cursor. They system alternately provides vertical and horizontal lines of the cursor cross.

Each time a transition from counting in one orthogonal direction to counting in the other orthogonal direction is made, one-shot multivibrator 64 is operated by nand-gate 34. The output of one-shot multivibrator 64 inhibits gates 30 and 32 for a short time, e.g. approximately 16 counts, preventing improper operation of the circuit. Otherwise, it is possible, by changing the $x$ and/or $y$ inputs to terminals 14 and 16, to cause the elimination of either the $x$ or the $y$ traces. It is therefore desired to avoid another transition in the immediate vicinity of the crossover. Comparison is avoided until the next line of the cross is formed.

Assuming that the cursor has been moved to a selected point on the cathode ray tube display by manipulation of the inputs at terminals 14 and 16, it will now in general be desired that information identifying such location be returned to the computer. The purpose of having a cursor will generally be the identification of particular data in the computer, establishing interaction with the computer. The exact coordinates of a particular point on a curve drawn by the computer may be desired so the curve can be corrected. Other uses will occur to those skilled in the art.

For entering information identifying cursor location into the computer, lead 68 of step counter is is energized enabling step counter 15 to count out of the zero state. The step counter will successively count to three and then stop. For counts of zero, one, and two, and-gate 12 continues to be enabled. However, when step counter 15 reaches three, gate 12 is disabled. At this point, counters 42 and 44 will contain the "address" comprising the $x$ and $y$ coordinates of the cursor as theretofore presented. This information may be transferred back to the computer from counters 42 and 44, e.g. on information channels 74 and 76. The "three" condition of the step counter 15 is detected by the absence of the seeking output at terminal 72 for an indication that the $x$ and $y$ counters do, indeed, contain valid information.

For some purposes it may be desired to count in one direction only, e.g. in the y direction. For this purpose, switch 66 may be closed, causing flip-flop 36 to remain in the zero state. Thus, information representing an independent variable may be entered into $x$ counter-register 42 from the computer, and the same information may be provided via digital to analog converter 46 at terminal 50 to an experiment. For example, terminal 50 may be connected as the frequency-controlling input of a spectrum analyzer. The DC output of the spectrum analyzer is then connected to the $y$ input terminal 16, and the circuit of FIG. 1 will perform an analog to digital conversion on the $y$ input only, entering the digital value of such $y$ input into counter 44. This information is then fed back to the computer. The $x$ information may then be changed, etc. This is only an example of an additional mode of operation of which the present system is capable.

Since the present cursor represents true horizontal and vertical lines relative to computer information, it is also useful for "sighting" purposes in directing the entry of similar lines by the computer. Two points can be aligned and identified by the cursor, and the computer directed to generate a straight line therebetween.

It will be noted that the cursor will accurately track the data stored on the face of the scope inasmuch as the same counter system is employed for entering the cursor, as was employed for entering the data to which the cursor refers. Thus, if counters 42 and 44 indicate the cursor is at given $x$ and $y$ digital positions, this will meaningfully and accurately place the cursor for the computer in relation to data supplied theretofore by the computer to the cathode ray tube. A high degree of accuracy is attained and misregistration errors are avoided. Furthermore, it is noted the cursor always proceeds to the comparison point from the same $x$ and $y$ directions. That is, the vertical trace moves upwardly from the bottom, and the horizontal trace moves to the right. Therefore, position error can be held to one least significant bit in each of the two axes, and ambiguity will not occur as in the case of cursors which actually move in two directions. The large cross cursor shape makes the cursor quite easy to find, because of the cursor occupying the entire cathode ray tube face. Thus, the user of the computer terminal does not have to search for the cursor, but it is easily seen at all times that it is desired.

Although two comparators and transition devices are described above, it is clear that a single comparator and a transition device can be used and switched between the $x$ and $y$ channels. Furthermore, although the system is particularly described in connection with a storage tube display, it will be apparent to those skilled in the art that a similar cursor may be provided in the case of refreshed cathode ray tube display or another form of display.

While I have shown and described a preferred embodiment of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. In a system for providing a cursor display in a cathode ray tube display system responsive to computer information, a cathode ray tube having deflection means, means for transforming digital information from a computer into analog deflection signals for said cathode ray tube, said transforming means including a first digital register and a first digital to analog converter means for transforming the contents of said first register into a deflection signal applied to said deflection means for producing deflection of the tube's electron beam in a first coordinate direction, means for receiving a first electrical quantity as an independent variable representative of a first analog coordinate of a cursor, means for causing said first digital register to count for production of a first cursor display line in a first coordinate direction on said cathode ray tube, circuit means for electrically comparing the resultant output of said first digital to analog converter means with said first electrical quantity representative of a first analog coordinate of said cursor, control means, operating in response to substantial equality of comparison detected by said circuit means, for causing the first register to discontinue counting, said means for transforming digital information from a computer into analog deflection signals for said cathode ray tube further including a second digital register and a second digital to analog converter means for transforming the contents of said second register into a deflection signal applied to said deflection means for producing deflection of the tube's electron beam in a second and substantially orthogonal coordinate direction, means for receiving a second electrical quantity as an independent variable representing a second analog coordinate of said cursor, means, responsive to said control means when said substantial equality of comparison is detected, for causing said second digital register to count for production of a second cursor display line in a second coordinate direction on said cathode ray tube starting from an intersection with the first cursor display line, said second register counting to an overflow value, and continuing from zero count producing two parts of said second cursor display line, and circuit means for electrically comparing the resultant output of said second digital to analog converter means with said second electrical quantity representative of a second analog coordinate of said cursor, said control means being further responsive to substantial equality of comparison of the last mentioned circuit means for causing said second register to discontinue counting, and said means for causing said first digital register to count being thereupon responsive to said control means for continuing counting in said first digital register and the production of the first cursor display line, said system continuing to alternate counting operations of said registers for providing said cursor display.

2. In a system for providing interactive graphics between a computer and a cathode ray tube display, a cathode ray tube, first counter means for receiving and registering digital signals from a computer representing data in a first display coordinate direction, first digital to analog converter means for transforming the contents of said first counter means into analog signal form for application to first deflection means of said cathode ray tube for producing deflection of the tube's electron beam, means for receiving a first electrical quantity representing an $x$ analog coordinate selected for a cursor as an independent variable, means for providing a series of inputs to said first counter means for stepping said first counter means producing a linear cursor display in a first coordinate direction on said cathode ray tube, circuit means for comparing the resultant output of said first digital to analog converter with the first electrical quantity, means for discontinuing said series of inputs to said first counter means when the output of said first digital to analog converter means substantially matches the said first electrical quantity, second counter means for receiving and registering a digital signal from a computer representing data in a second display coordinate direction, second digital to analog converter means for transforming the contents of said second counter means to analog signal form for application to second deflection means of said cathode ray tube for producing deflection of the tube's electron beam in a direction orthogonal to that produced by the first deflection means, means for receiving a second electrical quantity representing a y analog coordinate selected for a cursor as an independent variable, means, operative upon said discontinuance of said series of inputs to said first counter means, for providing a series of inputs to said second counter means for stepping the second counter means and producing a linear cursor display in the orthogonal direction on said cathode ray tube, circuit means for comparing the resultant output of said second digital to analog converter means with the second electrical quantity, and means for discontinuing said series of inputs to said second counter means when the output of said second digital to analog converter substantially matches the second electrical quantity.

3. The system according to claim 2 wherein said cathode ray tube is of the storage tube type adapted to store information from said computer received via said counter means, and further including means to energize the electron beam of said cathode ray tube for periods corresponding to each of said series of inputs, each such period being shorter than required to store information on said cathode ray tube.

4. In a system for providing interactive graphics between a computer and a cathode ray tube display, a cathode ray tube, an $x$ register and a $y$ register for receiving coordinate digital information from a computer, an $x$ digital to analog converter responsive to said $x$ register for providing an analog voltage applied in said cathode ray tube for producing $x$ deflection of the cathode ray tube's electron beam, means for receiving an $x$ analog input as an independent variable representative of the position of a cursor display, and $x$ comparison means for comparing said $x$ input with the output of said $x$ digital to analog converter, means for receiving counting pulses, a first gate means for coupling said counting pulses to said $x$ register, a $y$ digital to analog converter responsive to said register for providing an analog voltage applied to said cathode ray tube for producing y deflection of the cathode ray tube's electron beam, means for receiving a $y$ analog input as an independent variable further representative of the position of a cursor display, and $y$ comparison means for comparing said $y$ input with the output of said $y$ digital to analog converter, a second gate means for coupling said counting pulses to said $y$ register, a flip-flop characterized by two stable states and having its first output representing one state coupled as an input for operating said first gate means and a second output representing the other state coupled as an input for operating said second gate means, and further gating means responsive to said $x$ and $y$ comparison means for changing the state of said flip-flop when substantial equality of comparison occurs in either comparison means for operating the gate means in the alternative to produce a cross-shaped cursor on said cathode ray tube.

5. The system according to claim 4 further including means responsive to $x$ and $y$ comparisons for inhibiting said first and second gates respectively for one counting pulse only.

6. The system according to claim 4 further including a one-shot multivibrator also receiving said counting pulses for energizing said cathode ray tube's electron beam for predetermined periods in response to said counting pulses.

7. The system according to claim 4 further including a one-shot multivibrator responsive to said further gating means for inhibiting said further gating means from recognizing a comparison for a predetermined time after a comparison has been detected.

8. The system according to claim 4 further including a counter selectively responsive to the output of said further gating means for inhibiting said counting pulses after a predetermined count by said counter.

9. The system according to claim 4 further including means for selectively inhibiting a change of state of said flip-flop.

10. In a cathode ray tube display system including a cathode ray tube provided with deflection means, means for receiving a first analog signal representing a first coordinate on a screen of the cathode ray tube, a first comparator means for comparing said first analog signal with a corresponding deflection signal applied to the deflection means, means for receiving a series of clock pulses, a first counter means for counting said clock pulses, a first digital to analog converter means for transforming the output from said first counter means into analog form for application to the deflection means, means for receiving a second analog signal representing a second orthogonal coordinate on the screen of the cathode ray tube, a second comparator means for comparing said second analog signal with a deflection signal applied to the deflection means to produce orthogonal deflection in said cathode ray tube, a second counter means for counting said clock pulses, a second digital to analog converter means for transforming the output from said second counter means into analog form for application to the deflection means, first gate means for applying a series of said clock pulses to said first counter means until said first analog signal agrees with said corresponding deflection signal, second gate means responsive to said agreement for then applying a series of said clock pulses to said second counter means until said second analog signal agrees with the deflection signal applied to the deflection means producing orthogonal deflection, and control means for alternately energizing said first and second gate means to produce a cross hair cursor the cross point of which corresponds to said analog signals.

11. The system according to claim 10 including means connecting said counter means to a computer for receiving and sending digital signals therebetween.

12. The system according to claim 1, having a pair of transition detectors connected to the outputs of said comparator means for detecting the coincidence of said analog signals applied to each comparator means.

13. The system according to claim 10, wherein said counter means comprise counters cyclic in operation to start again at zero when said counters reach their maximum counts representing at least approximately maximum vertical deflection of the cathode ray tube.

14. The system according to claim 10, wherein said cathode ray tube is a storage type adapted to store data from a computer, and including means for energizing the electron beam of said cathode ray tube such that the cursor is not stored on said cathode ray tube.

15. The system according to claim 10 further including a one-shot multivibrator for unblanking the electron beam of the cathode ray tube periods.

* * * * *